March 7, 1967  H. E. KLINKENBERG  3,307,669
FRICTION COUPLING ELEMENT WITH VIBRATION LIMITER
Filed Dec. 16, 1964  2 Sheets-Sheet 1
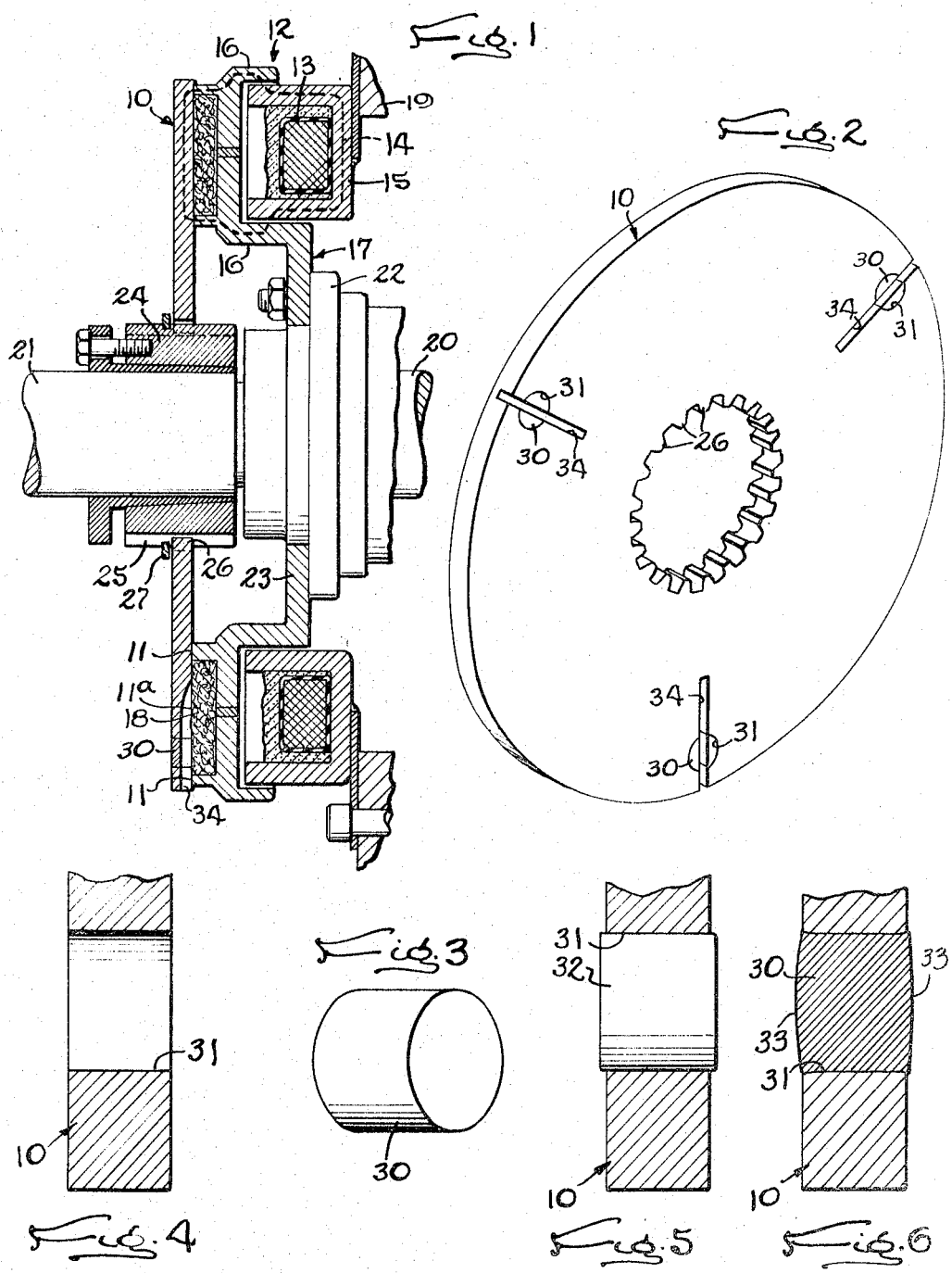
INVENTOR
Hubert E. Klinkenberg
By Wolfe, Hubbard __ __
ATTORNEYS

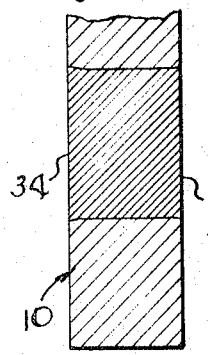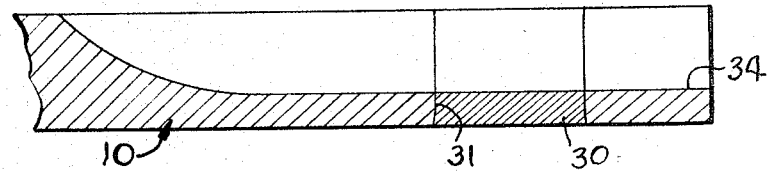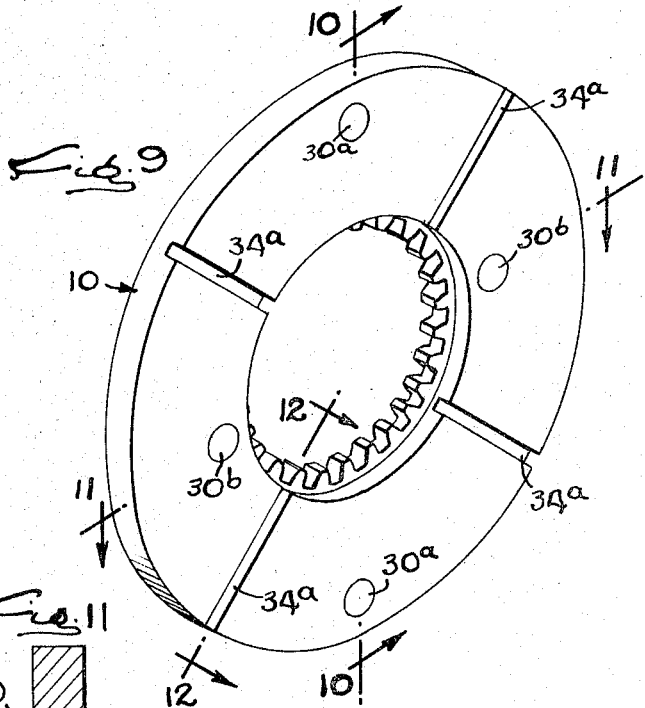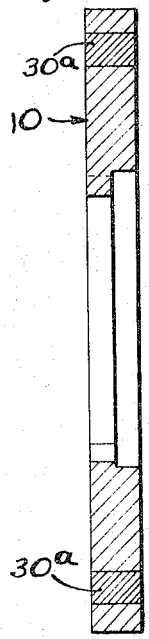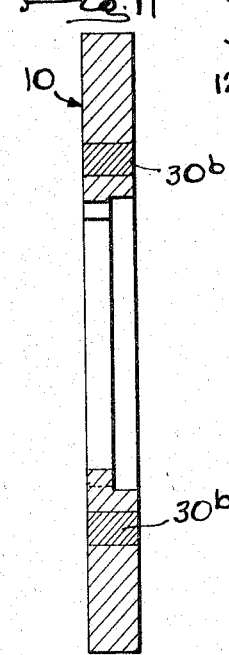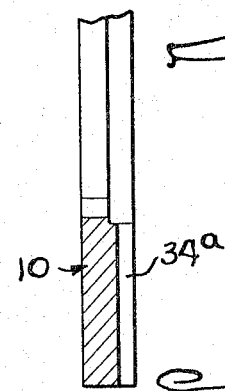

United States Patent Office 3,307,669
Patented Mar. 7, 1967

3,307,669
FRICTION COUPLING ELEMENT WITH
VIBRATION LIMITER
Hubert E. Klinkenberg, Beloit, Wis., assignor to Warner Electric Brake & Clutch Company, Beloit, Wis., a corporation of Delaware
Filed Dec. 16, 1964, Ser. No. 418,692
4 Claims. (Cl. 192—107)

This invention relates generally to friction couplings in which two relatively movable friction elements are drawn into gripping engagement to produce a clutch or braking action, one of the elements being a relatively thin and flat metal disk supported from its inner periphery. There is a tendency for vibration of audible and objectionable frequency to be set up in this disk when it is brought into gripping engagement with the coacting friction element of the coupling.

The general object is to provide a new and improved means of simple and inexpensive construction for changing the natural frequency of such vibration beyond the range of objectionable audibility.

Another object is to avoid such objectionable vibration by maintaining the disk under continuous edgewise stress of substantial magnitude.

A more detailed object is to obtain optimum effectiveness in the vibration changing by preloading the disk edgewise at a plurality of points angularly spaced around the disk and disposed between the inner and outer peripheries of the disk.

Other objects and advantages of the invention will become apparent from the following detailed description taken in connection with the accompanying drawings, in which FIGURE 1 is a fragmentary diametrical sectional view of a magnetic friction clutch embodying the present invention.

FIG. 2 is a perspective view of one of the coupling elements.

FIG. 3 is a perspective view of a part used in the vibration limiter.

FIGS. 4 through 8 are fragmentary sections of the element shown in FIG. 2 illustrating successive steps in the manner of incorporating the vibration limiter in a friction element.

FIG. 9 is a view similar to FIG. 2 showing a modification.

FIGS. 10, 11 and 12 are sections taken respectively along the lines 10—10, 11—11 and 12—12 of FIG. 9.

In the drawings, the invention is shown for purposes of illustration incorporated in an electromagnetically controlled friction clutch in which a relatively thin and flat disk 10 of magnetic material such as cast iron is drawn into axial gripping engagement with the pole and friction faces 11 and 11a of a magnet 12 of generally U-shaped radial cross-section upon energization of a multiple turn annular winding 13. The disk constitutes the armature of the magnet and coacts therewith to define a substantially closed flux circuit 14 of generally toroidal shape enclosing the winding. The flux circuit extends around and through a magnet core 15 having pole legs telescoped loosely within the magnetically separated pole pieces 16 of a rotor 17 constituting the driven element of the clutch. The friction face 11a is on segments 18 of friction material seated in the rotor between the pole faces 11. The core 15 is fixed to a suitable support 19 in which is journaled a driven shaft 20 axially alined with a driving shaft 21 and fixed to a collar 22 by which the rotor 17 is supported through the medium of a flange 23 on the inner pole piece 16.

A collar 24 fixed on the driving shaft is formed with spline teeth 25 adapted to receive and mate with teeth 26 around the internal periphery of the armature disk 19. A snap ring 27 holds the armature in close proximity to the magnet pole faces.

Upon energization of the winding 13, the flux threading the circuit 14 draws the armature disk 10 into axial gripping engagement with the faces 11 and 11a of the magnet thus developing a friction torque which is applied to the shaft 20 to initiate rotation thereof. The transmission of driving torque continues so long as the winding remains energized.

When a relatively thin metal part such as the armature 10 above described is drawn into frictional gripping engagement under substantial pressure with a relatively rigid part such as the rotor 17, angular vibrations develop in the weaker part. This causes objectionable noise during service operation when the frequency of the vibration is at or near the natural frequency of vibration of the part.

The present invention aims to change, increase in the present instance, the natural frequency of the armature 10 beyond the range of objectionable audibility by prestressing the metal of the armature in an edgewise direction and at a plurality of points angularly spaced around the armature preferably between the inner and outer peripheries thereof. While such stressing may be effected in various ways, it is achieved simply and inexpensively in the present instance by plugs 30 disposed in angularly spaced holes 31 in the disk 10 and composed of material which when compressed in one direction while confined in a transverse direction will retain such stressing and transmit the same in the latter direction. Preferably, the plugs are composed of relatively ductile metal such as brass or bronze and comprise cylinders 32 slightly longer than the thickness of the armature and of substantially the same initial diameter as the holes 31. The latter are sized accurately and disposed between the inner and outer peripheries of the armature and near the outer periphery in the preferred form shown in FIGS. 1 to 8. Three brass (SAE 72) plugs a quarter of an inch in diameter, expanded within a hole of the same diameter, have been found to be effective in eliminating objectionable vibration noise of a cast iron armature disk about .216 of an inch thick and having outer and inner diameters of 4.0 and 2.375 inches.

To effect the stressing, the plugs are first pressed into the holes as shown in FIG. 5 with opposite ends projecting equidistantly from opposite sides of the armature disk. The plugs are then compressed axially as by sharp peening blows on one end while the other end is backed rigidly. This causes a transaxial flow of the metal expanding the plugs against the walls of the holes thus converting the axial compression of the plugs into radial and edgewise stressing of the disk. These stresses are retained by virtue of the ductility of the metal of the plugs and continues to be maintained throughout the service life of the armature. After expansion of the plugs within the armature holes, the projecting end positions 33 are cut off so as to leave flat ends 34 as shown in FIG. 7.

In armatures of the present character, it is desirable to provide one or more grooves 34 extending radially across the full width of the friction face for receiving and disposing of particles produced during slipping engagement with the magnet face under high pressure. In the form shown in FIGS. 1 to 8, such grooves of squared cross-section are cut along radii including the plugs 30. Herein, the grooves are somewhat narrower, .097 of an inch, than the diameter of the plugs and about two thirds as deep as the thickness of the disk, the inner ends decreasing in depth toward their inner ends, as shown in FIG. 8.

Other spacings of the plugs 30 relative to each other and to the grooves 34 have been found equally effective to increase the natural vibration frequency of the armature disk beyond the objectionable range. As shown in FIGS. 9 to 12, four plugs 30$^a$ and 30$^b$ are spaced equidistantly around the armature disk and respectively disposed near the outer and inner margins of the disk, the grooves 34$^a$ being of substantially the same depth as before but disposed in between the adjacent plugs 30$^a$ and 30$^b$.

I claim as my invention:

1. A friction coupling having two rings mounted for relative rotation about a common axis and adapted for axial gripping engagement to develop a driving torque, one of said rings comprising a relatively thin and flat solid disk of iron, holes extending through and angularly spaced around said disk and each defined by a continuous peripheral wall, and solid ductile metal plugs in said holes; said plugs being radially expanded within said holes and exerting a continuous radial force against said walls to maintain portions of the metal of the disk around the full circumference of said holes under radially compressive stress sufficient to impart to the disk as a whole a natural frequency of vibration which is beyond the range of objectionable audibility during gripping engagement of said rings.

2. A friction disk as defined in claim 1 in which said holes are radially spaced from the outer and inner peripheries of the disk.

3. A friction coupling as defined by claim 1 in which said plugs are composed of a metal material such as brass.

4. A friction coupling having two rings mounted for relative rotation about a common axis and adapted for axial gripping engagement to develop a driving torque, one of said rings comprising a relatively thin and flat solid disk of iron, a hole extending through said disk and defined by a continuous peripheral wall, and a solid ductile metal plug in said hole, said plug being radially expanded within said hole and exerting a continuous radial force against said peripheral wall to maintain portions of the metal of the disk around the full circumference of said hole under radially compressive and continuous edgewise stress sufficient to impart to the surrounding area of the disk a natural frequency of vibration which is beyond the range of objectionable audibility during gripping engagement of said rings.

References Cited by the Examiner

UNITED STATES PATENTS

| | | | |
|---|---|---|---|
| 1,780,234 | 11/1930 | Johnston | 188—218 |
| 2,265,340 | 12/1941 | Bond | 188—218 |
| 2,288,438 | 6/1942 | Dach | 188—1 X |
| 2,421,925 | 6/1947 | Cooley | 192—107 X |
| 2,986,238 | 5/1961 | Eaton | 188—251 |

DAVID J. WILLIAMOWSKY, *Primary Examiner.*

BENJAMIN W. WYCHE III, *Examiner.*